Nov. 6, 1962  C. J. UNDERWOOD  3,062,557
SEALING RINGS
Filed July 6, 1959
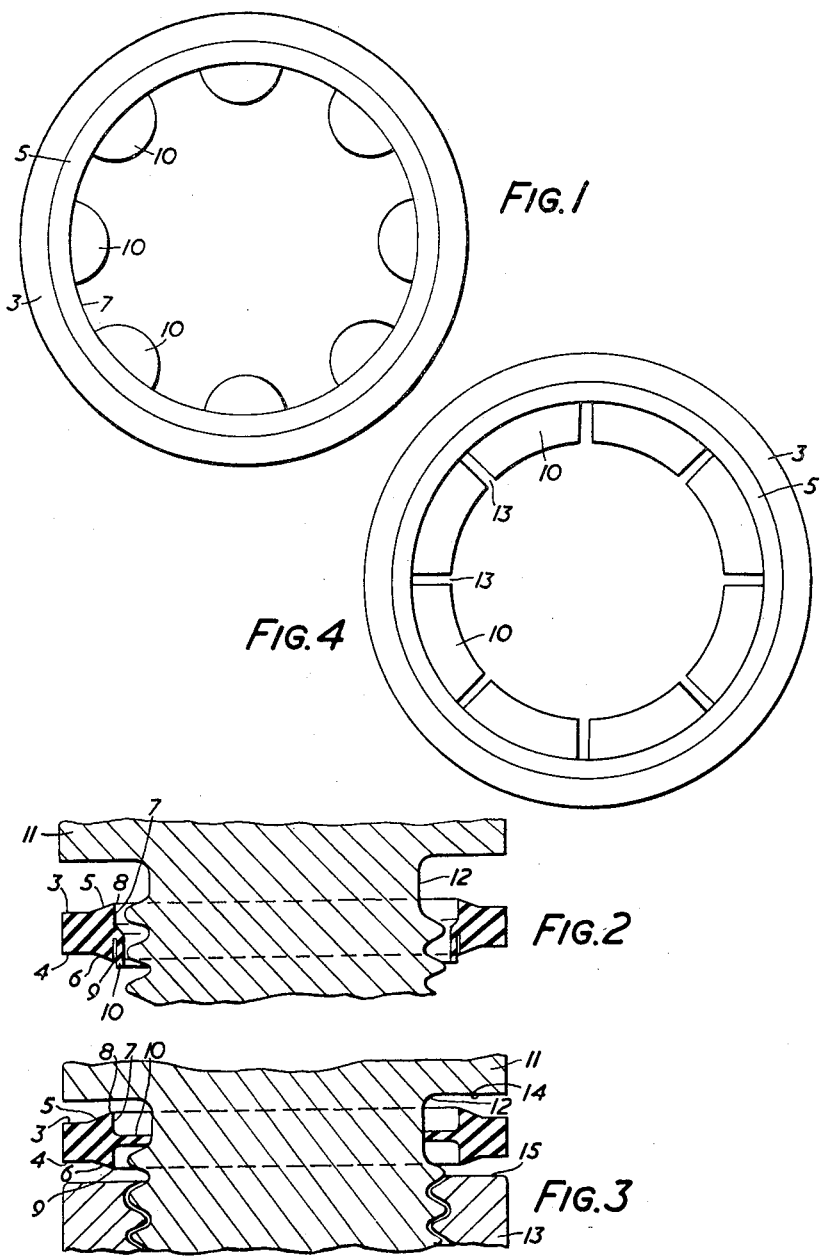
INVENTOR
Cyril James Underwood
BY
Reynolds, Beach & Christensen
ATTORNEYS United States Patent Office 3,062,557
Patented Nov. 6, 1962

3,062,557
SEALING RINGS
Cyril James Underwood, Coberley, near Cheltenham, England, assignor to Dowty Seals Limited, Ashchurch, Tewkesbury, England
Filed July 6, 1959, Ser. No. 825,190
8 Claims. (Cl. 277—212)

This invention relates to sealing rings for use between two members having axially separated joint faces and around a generally cylindrical member which extends between them. The cylindrical member may, for example, be a screw-threaded bolt used for securing the two members, and one of the axially separated members may in fact be the head of the bolt between which and the other member a fluid-tight joint is to be made.

One object of the invention is to enable such a sealing ring to be located on a cylindrical component, for example a screw-threaded bolt, prior to assembly of the joint. A further object is to provide the seal with means enabling the ring to be centered when the joint is made.

According to the invention a sealing device for the use specified comprises a ring formed in part at least of resilient material having sealing faces on opposite sides thereof, an internal surface extending between the sealing faces, and a number of separate projections which are integral with the resilient material extending inwardly from the internal surface of the ring, each projection being thin in relation to its radial dimension so as to be capable of bending at its base.

In the accompanying drawings:

FIGURE 1 is a plan view of one form of sealing ring made in accordance with the invention.

FIGURE 2 is a cross-sectional view showing the sealing ring being introduced on to a screw-threaded member.

FIGURE 3 is a cross-sectional view showing the sealing ring located in the screw-thread undercut of the member; and FIGURE 4 is a plan view of a modified form of sealing ring.

The ring shown in FIGURES 1, 2 and 3 is formed as a moulding of flexible elastomeric material, preferably nylon, comprising an outer portion having flat faces 3 and 4 on opposite sides thereof which merge radially inwardly into frusto-conical divergent joint faces 5 and 6. The divergent faces intersect the internal surface or bore 7 of the ring at acute angled edges 8 and 9.

In accordance with the invention, a number of equally spaced projections 10 shown as of semi-circular form, are moulded integrally with the ring to lie in a plane intermediate the edges 8 and 9, and preferably midway therebetween. Eight such semi-circular projections 10 are shown in FIGURE 1 directed radially inwardly from the bore 7 of the ring. Each projection is thin in relation to its radial dimension and, being of the same deformable elastomeric material as the ring, is capable of bending at its base, see FIGURE 2, to allow the ring to be inserted over a cylindrical component, such as the screw-threaded bolt 11, which is used to make the sealed joint, and which is of an external diameter greater than the internal diameter subtended by the projections collectively.

The diameter of the bore 7 is larger than the tip diameter of the screw thread of the bolt 11, by an amount which gives an annular clearance between them somewhat greater than the thickness of the projections 10. The projections 10 are seen in FIGURE 2 lying in the clearance parallel to the bore 7. When the sealing ring has been pushed to the end of the screw thread the projections may spring back into their normal radial positions within the undercut 12 at the end of the screw thread, see FIGURE 3. The radial length of the projections 10 is chosen so that for a given size of screw thread their tips lie close to or touch the base of the undercut 12. The projections 10 therefore have a centralizing effect on the sealing ring when the fluid-tight joint is made, as for example between the bolt 11 and the screw threaded member 13 into which the bolt is screwed.

The bolt 11 and the screw-threaded member 13 will usually have flat parallel faces 14 and 15 respectively which engage the sealing edges 8 and 9, and tend to deform them radially inwardly when the joint is tightened. The clearance between the bore 7 and the screw thread is, however, sufficient to prevent the edges 8 and 9 from touching the tips of the screw thread and being damaged by them.

It is thus seen how the projections 10 can hold the ring on a component such as the screw threaded bolt 11 prior to assembly of the fluid-tight joint, and that when the joint is tightened the projections 10 act to centralize the sealing ring thereon.

The projections, according to the invention, are essentially separated one from the other so that each can bend independently of the other. If a continuous internally directed flange of the same diameter and thickness were employed great difficulty would be experienced in introducing a seal thus formed over a cylindrical component as the resistance in tension would greatly exceed the resistance in bending of a number of separated projections.

The projections may, nevertheless, be largely continuous over the inner circumference of the ring as shown in FIGURE 4 at 10a, though each is separate from the next by a narrow slot 13 which extends to the bore of the ring.

The ring may in a modified form have its radially outer portion of rigid material to act as a confining ring for the resilient portion within it.

I claim as my invention:

1. A sealing device suitable for use between two members which have axially separated joint faces and around a third member extending between the two members, said device including a body of resilient non-metallic material having an opening extending completely therethrough and through which the third member can be inserted, axially opposite sealing faces on said body for contact with the respective joint faces of the two members, the wall of the opening extending between the sealing faces, the sealing faces including outer portions substantially normal to the axis of the opening and inner portions diverging from the outer portions to the wall of the opening, and a series of separate projections integral with the wall of the opening and extending towards the central axis of the opening, each projection being thin at its juncture with the wall of the opening in relation to its length and also in relation to the length of the wall of the opening whereby each projection is capable of flexing during installation by movement in an axial direction over the third member and by its inherent resiliency resuming its original position when installed.

2. A sealing ring having inner and outer peripheral portions of which the inner peripheral portion is formed of resiliently deformable material, the end faces of the outer peripheral portion extending substantially normal to the axis of the ring and the end faces of the inner peripheral portion extending axially outwardly from the respective end faces of the outer peripheral portion toward the ring axis and along an acute angle therewith, the inside edge portions of the respective end faces of the inner peripheral portion being rabbetted therearound to form an annular tongue on said inner peripheral portion extending radially inwardly of the ring toward said ring axis and divided radially into a series of projections each of which has such an axial thickness at its juncture with the unrelieved inner peripheral portion, relative to the radially inward extent thereof, as to be bendable resiliently under forces exerted axially thereof.

3. A sealing ring according to claim 2 wherein the inside edge portions of the respective end faces of the inner peripheral portion are rabbetted to such depth as to form an annular tongue which is thin relative to the distance between said end faces of the inner peripheral portion.

4. A sealing ring according to claim 2 wherein the end faces of the inner peripheral portion extend at the same angle relative to the ring axis.

5. A sealing ring according to claim 2 wherein the annular tongue extends radially inwardly of the ring substantially midway between the end faces of the outer peripheral portion.

6. A sealing ring according to claim 2 wherein the annular tongue extends radially inwardly of the ring along a plane disposed perpendicular to the ring axis substantially midway between the intersection of the projections of said end faces of the inner peripheral portion with the ring axis.

7. A sealing ring according to claim 2 wherein the tongue is divided radially into a plurality of spaced sections each of which has a curvilinear outline.

8. A sealing ring according to claim 2 wherein the outer peripheral portion is also formed of resiliently deformable material.

References Cited in the file of this patent

UNITED STATES PATENTS

| | | |
|---|---|---|
| 949,658 | Randall | Feb. 15, 1910 |
| 2,102,673 | Brown | Dec. 21, 1937 |
| 2,439,306 | Laidley | Apr. 6, 1948 |
| 2,455,982 | Dowty | Dec. 14, 1948 |
| 2,492,115 | Crowther | Dec. 20, 1949 |
| 2,761,347 | McKee | Sept. 4, 1956 |